(12) United States Patent
Nathanel et al.

(10) Patent No.: US 9,477,995 B2
(45) Date of Patent: Oct. 25, 2016

(54) SYSTEM, DEVICE, AND METHOD OF ELECTRONIC PAYMENT

(71) Applicants: Tal Zvi Nathanel, New York, NY (US); Shlomit Kugler, Tel Aviv (IL); Israel Erez Spatz, Ramat Gan (IL)

(72) Inventors: Tal Zvi Nathanel, New York, NY (US); Shlomit Kugler, Tel Aviv (IL); Israel Erez Spatz, Ramat Gan (IL)

(73) Assignee: Quick Check Ltd., Tel Aviv (IL)

(*) Notice: Subject to any disclaimer, the term of this patent is extended or adjusted under 35 U.S.C. 154(b) by 0 days.

(21) Appl. No.: 14/272,525

(22) Filed: May 8, 2014

(65) Prior Publication Data

US 2014/0244409 A1  Aug. 28, 2014

Related U.S. Application Data

(63) Continuation-in-part of application No. 13/411,570, filed on Mar. 4, 2012.

(60) Provisional application No. 61/820,719, filed on May 8, 2013.

(51) Int. Cl.
*G06Q 50/12* (2012.01)
*G06Q 20/32* (2012.01)
*G06Q 20/20* (2012.01)
*G06Q 20/38* (2012.01)
*G06Q 30/02* (2012.01)

(52) U.S. Cl.
CPC .............. *G06Q 50/12* (2013.01); *G06Q 20/20* (2013.01); *G06Q 20/327* (2013.01); *G06Q 20/3224* (2013.01); *G06Q 20/3274* (2013.01); *G06Q 20/385* (2013.01); *G06Q 30/02* (2013.01)

(58) Field of Classification Search
CPC .... G06Q 50/12; G06Q 20/327; G06Q 20/20; G06Q 30/02; G06Q 20/3274; G06Q 20/385; G06Q 20/3224
See application file for complete search history.

(56) References Cited

U.S. PATENT DOCUMENTS

| | | | |
|---|---|---|---|
| 8,498,900 B1 | 7/2013 | Spirin et al. | |
| 2002/0069165 A1* | 6/2002 | O'Neil | 705/40 |
| 2005/0043996 A1* | 2/2005 | Silver | 705/15 |
| 2010/0131347 A1 | 5/2010 | Sartipi | |
| 2013/0173387 A1 | 7/2013 | Adelaar | |
| 2013/0204745 A1 | 8/2013 | Martin | |

OTHER PUBLICATIONS

"What happens when you leave your credit card at a bar?", blod by Erik Maza, Jan. 12, 2009, http://weblogs.baltimoresun.com/entertainment/midnight_sun/blog/2009/01/whats_up_with_flips.html.*

(Continued)

*Primary Examiner* — Mussa A Shaawat
(74) *Attorney, Agent, or Firm* — Eitan, Mehulal & Sadot

(57) ABSTRACT

A system and method allow a customer to perform self-checkout at a real-world non-virtual store or restaurant or other business establishment that the customer is visiting. The customer pre-defines an electronic payment method. The customer visits the business establishment, and the system generates a unique user-specific code that is a function of the time, the location, and the specific customer. The code is displayed on the mobile device of the customer, which is then shown to an employee of the business establishment, which then enters the unique code into a Point of Sale terminal; thereby generating an association between an ongoing open tab of the customer, and the mobile device of the customer. The customer is able to perform self checkout of the open tab, without requiring action on behalf of the business establishment.

13 Claims, 5 Drawing Sheets

(56) References Cited

OTHER PUBLICATIONS

Erik Maza, What happens when you leave your credit card at a bar? Jan. 2009, Midnight Sun, The Baltimore Sun http://weblogs.baltimoresun.com/entertainment/midnight_sun/blog/2009/01/what_happens_when_you_leave_yo.html.

* cited by examiner

SYSTEM, DEVICE, AND METHOD OF ELECTRONIC PAYMENT

CROSS-REFERENCE TO RELATED APPLICATIONS

This application claims priority and benefit from U.S. provisional patent application No. 61/820,719, titled "System, Device, and Method of Electronic Payment", filed on May 8, 2013, which is hereby incorporated by reference in its entirety.

This application is a Continuation-In-Part (CIP) of U.S. patent application Ser. No. 13/411,570, titled "Device, System, and Method of Electronic Payment", filed on Mar. 4, 2012, which is hereby incorporated by reference in its entirety.

FIELD

The present invention relates to the field of electronic payments.

BACKGROUND

Many people frequent restaurants, diners, bars, and other establishments which may offer various food items and drinks. For example, a patron in a restaurant may order food items and drinks from a waiter, by selecting items from a printed menu of the restaurant.

In many establishments, particularly those in which waiters and waitresses serve food items, the patron is expected to pay upon completion of his meal rather than while ordering the food items. For example, once the patron consumed his food and drink and is ready to leave the restaurant, the patron may summon the waiter to request a check or a bill for the meal. The waiter may generate the check, for example, manually or from a cash register of the restaurant, and may bring the check to the patron (e.g., optionally on a small tray or in a leather booklet). The patron may then pay the bill for his meal, for example, by cash, by writing a personal check, or by providing a credit card or debit card to be charged by the restaurant.

SUMMARY

The present invention may provide, for example, devices, systems, and method of electronic payment.

According to the present invention, a patron in a restaurant may be able to utilize his smartphone (or other portable wireless electronic device, or portable device able to connect to the Internet or to a cellular network) in order to autonomously close his open tab at a restaurant (or other business establishment being visited by the patron), and to electronically pay the amount due to the restaurant as well as a discretionary gratuity.

According to the present invention, the patron may perform these operations without the need to summon a waiter or to signal to a waiter, and without the need to request a check or to wait for receiving a printed (or handwritten) check. Furthermore, the patron may autonomously close his tab, pay, and leave the restaurant without the need to give to the waiter any tangible object (e.g., credit card, debit card, cash), and without the need to wait for receiving any tangible object back from the waiter (e.g., receiving back a credit card or debit card; or receiving back change in cash).

In accordance with the present invention, for example, a server to facilitate electronic payment to a business establishment may include: a customer profile database to store at least payment method information provided by a consumer; and an associator module to receive a message indicating that said consumer is visiting said business establishment, and to generate a unique code temporarily associating a smartphone of said consumer to a purchase tab associated with said consumer at said business establishment.

In accordance with the present invention, for example, a point-of-sale terminal for use in a business establishment may include a tab associator module to temporarily link between (i) a purchase tab of a patron of said business establishment, and (ii) a portable electronic device of said patron.

In accordance with the present invention, for example, a method implementable on a portable electronic device of a consumer may include: transmitting to a remote server an indication of an identity of a business establishment in which said portable electronic device is located; and receiving from said remote server a unique code temporarily linking said portable electronic device with a purchase tab associated with said consumer at said business establishment.

The present invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF SOME EMBODIMENTS

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that a patron at a restaurant, who has consumed his meal and desires to leave, may be required to waste time by trying to catch the attention of a waiter, by having to summon the waiter, by requesting a check from the waiter, by waiting to receive a printed check or a written check from the waiter, by summoning the waiter again in order to provide a tangible payment instrument (e.g., cash, credit card, debit card), and by waiting for the waiter to return yet again with a tangible item (e.g., change in cash; receipt of credit card payment or debit card payment).

Applicants have further realized that the power to end a patron's visit in a restaurant is not in the hands of the patron, who is dependent on the attention and availability of the waiter. Applicants have further realized that a smartphone or other mobile electronic device may be utilized in order to shift the power to end the patron's visit to be entirely at the hands of the patron, and to allow the patron to autonomously and independently "close the tab", optionally add a discretionary gratuity amount ("tip"), pay the restaurant (e.g., electronically), and leave the restaurant, without requiring any further attention or assistance from a waiter or from other staff member of the restaurant.

Although portions of the discussion herein may relate, for demonstrative purposes, to payment made by a patron to a restaurant for food items, the present invention may be used in conjunction with payments made to other business establishments or vendors or sellers, and/or for other types of goods and/or services.

Figure 1A:
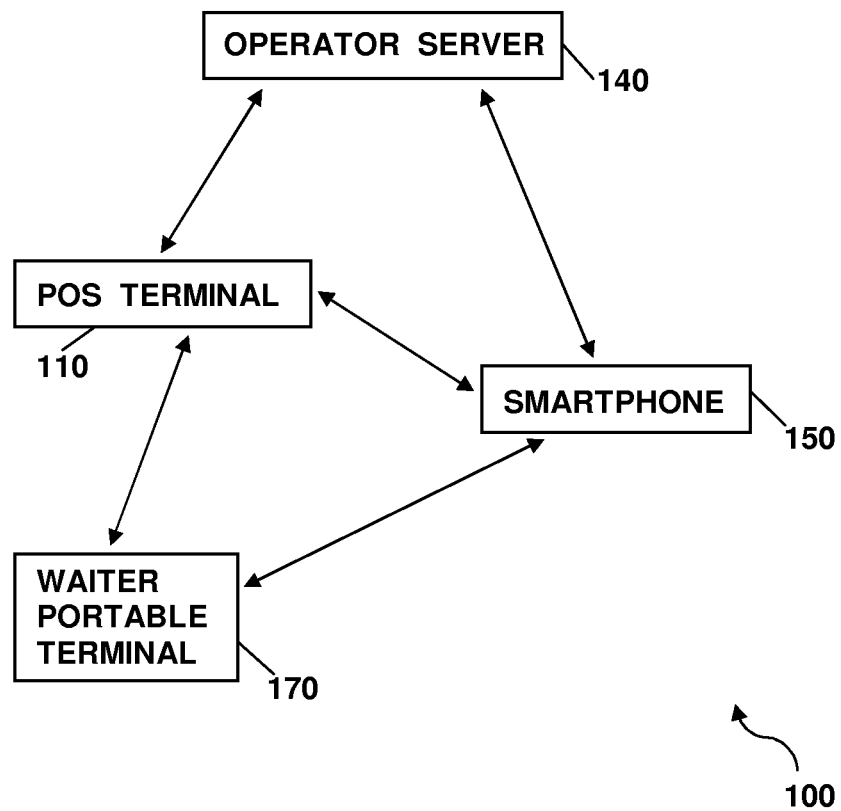
FIGS. 1A-1D are schematic block diagram illustrations of a system and its components, in accordance with some demonstrative embodiments of the present invention.
Figure 1B:
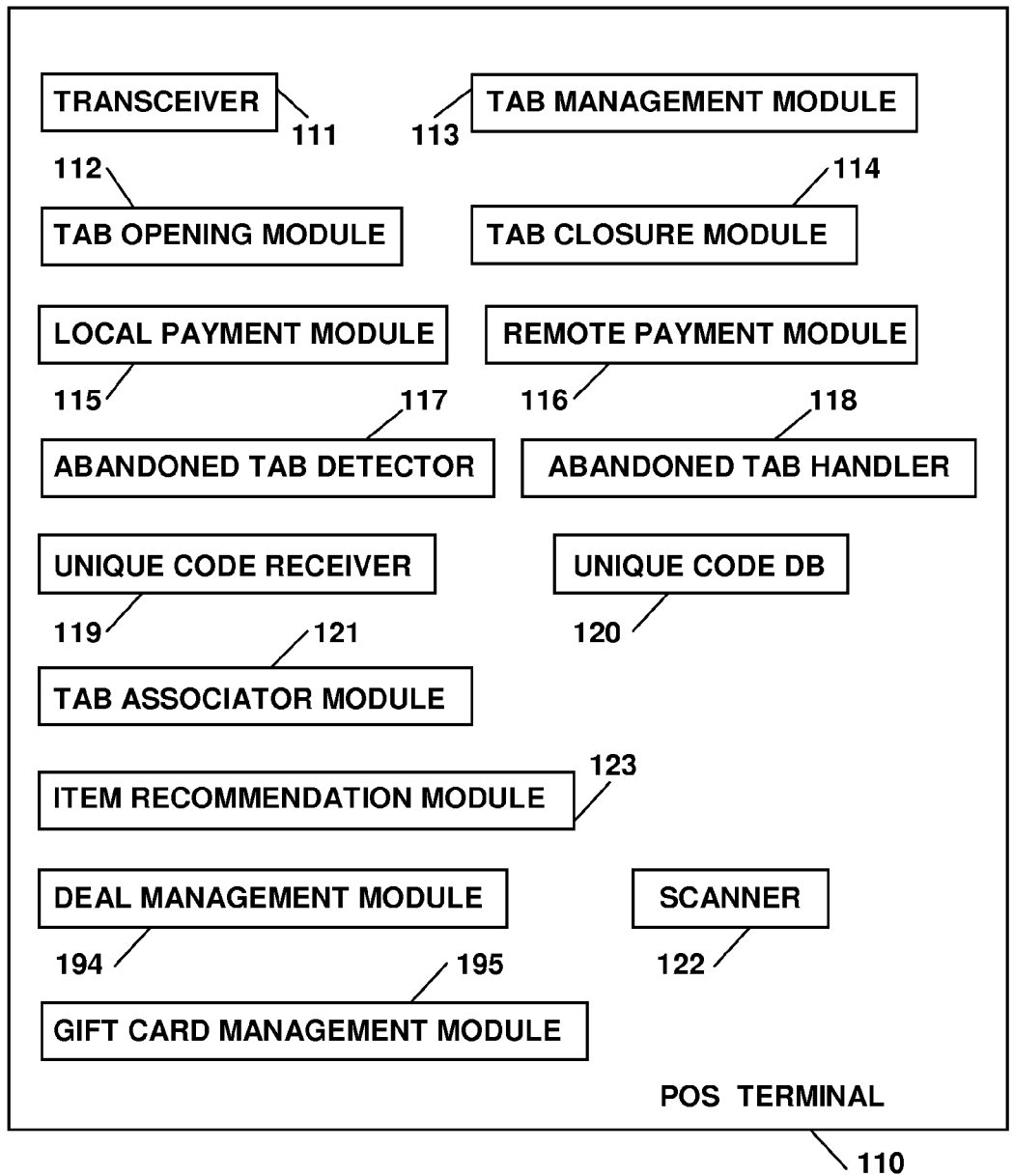
Figure 1C:
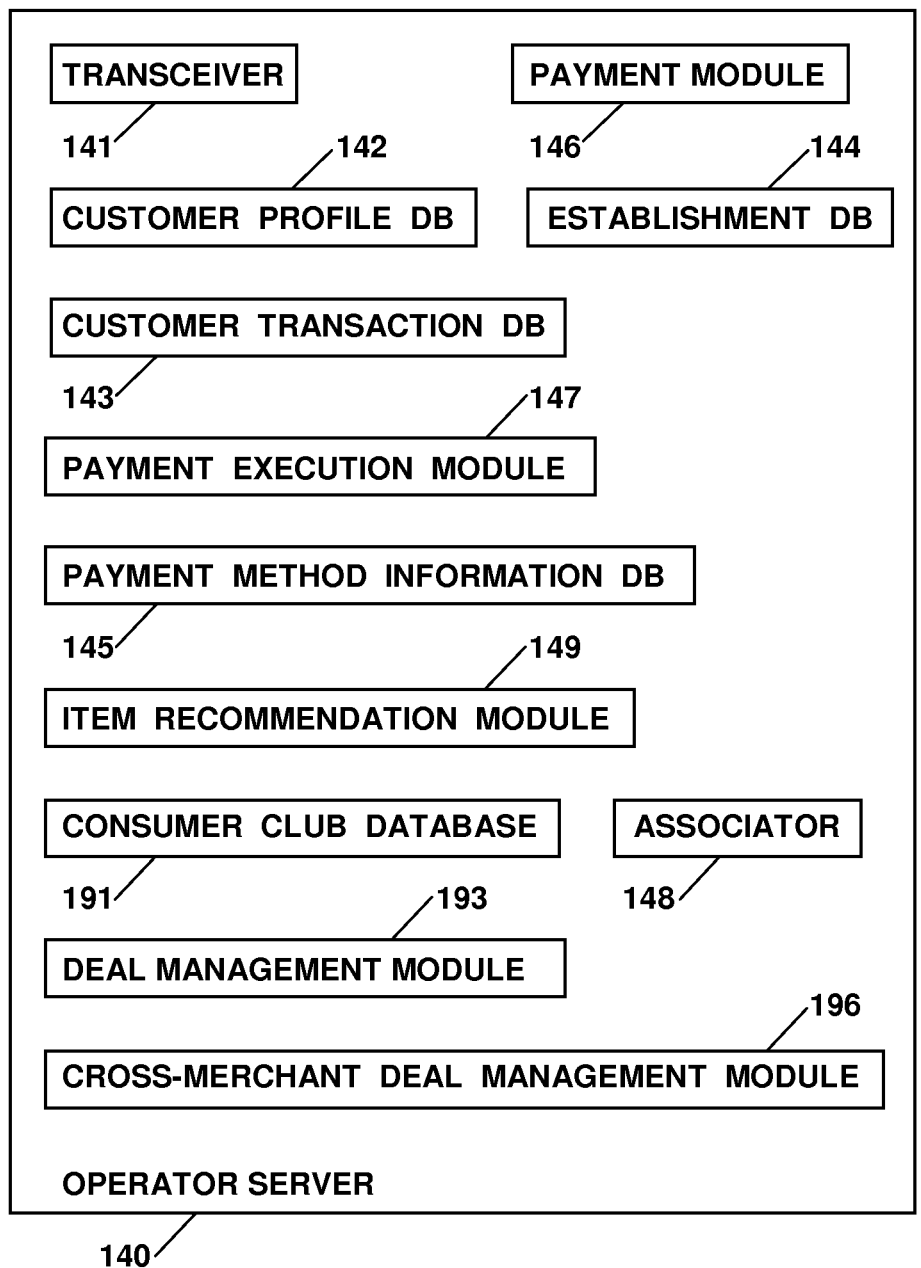
Figure 1D:
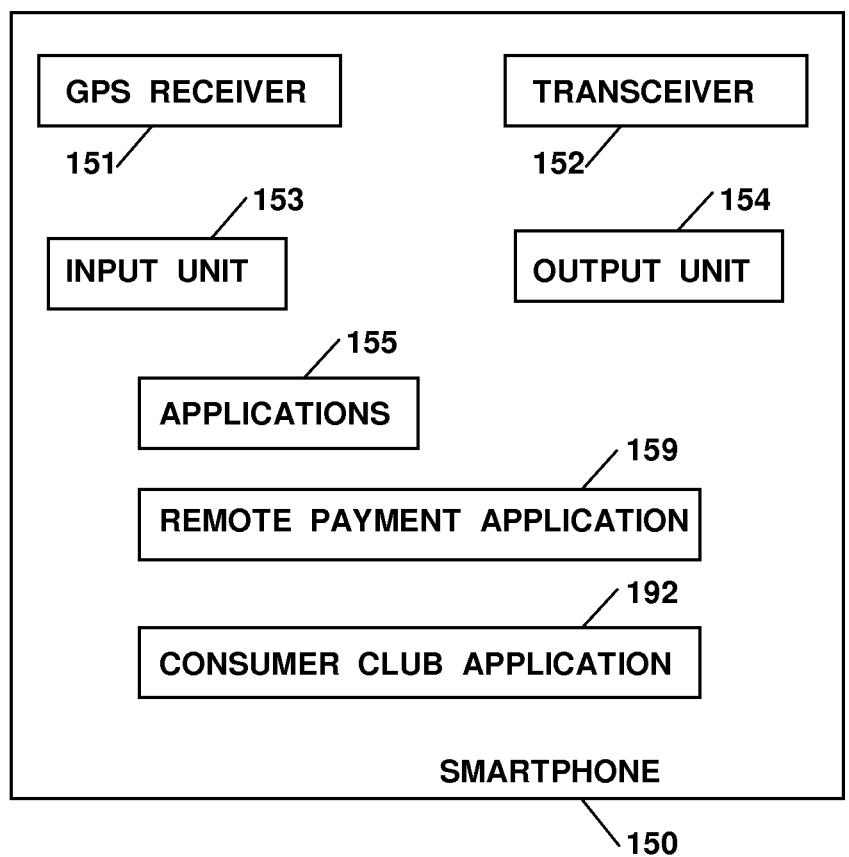

Reference is made to FIG. 1A, which is a schematic block diagram illustration of a system 100 in accordance with some demonstrative embodiments of the present invention. System 100 may include, for example, a Point Of Sale (POS) terminal 110, a smartphone 150, an operator server 140, and optionally a waiter portable terminal 170. Reference is further made to FIG. 1B, which shows in greater detail POS terminal 110 and its components; to FIG. 1C, which shows in greater detail operator server 140 and its components; and to FIG. 1D, which shows in greater detail smartphone 150 and its components.

In accordance with the present invention, POS terminal 110 may be operated by an establishment, whereas smartphone 150 may be operated by a patron. Operator server 140 may be operated by a third-party provider, or by the establishment which also operates POS terminal 110. Optionally, waiter portable terminal 170 may be operated by a waiter or other service person of that establishment.

The establishment may register its POS terminal 110 with operator server 140. Similarly, the patron may register his smartphone 150 with operator server 140; and may provide to operator server one or more payment method information items of the patron, for example, credit card data (e.g., type of card, name on card, card number, expiration date, security code).

The patron may indicate to operator server 140, that the patron is visiting the particular establishment. Optionally, smartphone 150 may autonomously detect the identity of the visited establishment, for example, based on Global Positioning System (GPS) data or other location-based data that smartphone 150 may obtain.

In response, operator server 140 may generate a unique code (e.g., a four-character string), and may provide the unique code to smartphone 150 of the patron. In some embodiments of the present invention, the unique code may be generated by operation server substantially immediately, and without performing pre-authorization or authorization operations. In other embodiments of the present invention, the unique code may be generated only after operator server 140 performs pre-authorization of a payment method entered by the patron (for example, credit card or debit card), optionally pre-authorizing a pre-defined monetary amount which may depend on the type or identity of the establishment (e.g., 100 Dollars for a restaurant; 60 Dollars for a coffeeshop); this way the merchant or vendor that operates the establishment is ensured that the transaction will clear. In some embodiments of the present invention, the unique code generated by operator server 140 and provided to smartphone 150 of the patron may be time-sensitive (e.g., may expire within a pre-defined time period, for example, 180 minutes); and may be location-based (e.g., may allow a temporary linkage between smartphone 150 and POS terminal 110 of establishment 140, but not of a different establishment located at a different geographical place or even nearby or across the street); and may be user-specific (e.g., such that smartphone 150 of a first patron receives and utilizes a first unique code, whereas, a smartphone of another patron, which visits the same establishment at the same time, receives and utilizes a different unique code).

The patron may order food items from the establishment, for example, through a waiter; and the patron may provide the unique code to such waiter. In some embodiments of the present invention, the unique code may be generated by operation server substantially immediately, and without performing pre-authorization or authorization operations. In other embodiments of the present invention, the unique code may be generated only after operator server 140 performs pre-authorization of a payment method entered by the patron (for example, credit card or debit card), optionally pre-authorizing a pre-defined monetary amount which may depend on the type or identity of the establishment (e.g., 100 Dollars for a restaurant; 60 Dollars for a coffeeshop); this way the merchant or vendor that operates the establishment is ensured that the transaction will clear. In some embodiments of the present invention, the unique code generated by operator server 140 and provided to smartphone 150 of the patron may be time-sensitive (e.g., may expire within a pre-defined time period, for example, 180 minutes); and may be location-based (e.g., may allow a temporary linkage between smartphone 150 and POS terminal 110 of establishment 140, but not of a different establishment located at a different geographical place or even nearby or across the street); and may be user-specific (e.g., such that smartphone 150 of a first patron receives and utilizes a first unique code, whereas, a smartphone of another patron, which visits the same establishment at the same time, receives and utilizes a different unique code.

Accordingly, from that time and onward, the tab of the patron at the establishment may be associated with the unique code that the patron's smartphone 150 received from operator server 140. The tab of the patron may be managed by the establishment; for example, the waiter may utilize POS terminal 110 to add to the patron's tab any food item(s) that the patron orders.

In accordance with the present invention, the patron may autonomously and/or independently close his tab, pay electronically, and leave the establishment, without requiring assistance and/or attention from the waiter or from other workers of the establishment. For example, upon consuming his meal, the patron may command his smartphone 150 to close the tab and pay electronically. In response to such command, smartphone 150 may send a signal to operator server 140, indicating that the patron desires to close his tab and pay. Operator server 140 may send a message to POS terminal 110, indicating that the patron desires to close his tab and pay, the message indicating the unique code assigned to that patron. POS terminal 110 may autonomously close the tab associated with that unique code; and may send back to operator server a message indicating the total amount due for payment by the patron for that closed tab. Operator server 140 may send to smartphone 150 a message indicating the amount due for payment.

The patron may, on his smartphone 150, receive the message sent by operator 140 indicating the amount due for payment to the establishment. Optionally, the patron may utilize his smartphone 150 to indicate that the patron desires to add to the amount due a discretionary gratuity amount, which value the patron may provide to smartphone 150. Smartphone 150 may thus display to the patron the total amount due, with the discretionary gratuity, for final confirmation of the patron.

The patron may then utilize his smartphone 150 to confirm the payment. As a result, smartphone 150 may send a message to operator server 140, indicating that the patron desires to electronically pay to the establishment, and further indicating the total amount that the patron desires to pay.

Operator server 140 may perform one or more processes in order to effectuate the electronic payment that the patron instructed to perform. For example, in some embodiments, operator server 140 may utilize the patron's previously-provided credit card data in order to charge the patron's credit card with the total amount due (optionally, together with an additional handling fee or convenience fee), and in order to transfer the amount due to an account of the establishment; and operator server 140 may send a message to POS terminal 110 indicating that the closed tab has been paid by the customer, and optionally indicating the amount of gratuity added by the patron. In other embodiments, operator server 140 may perform the electronic payment as described above, but may deduct a small handling fee or convenience fee from the total amount paid to the establishment, rather than (or in addition to) adding such fee to the amount charged to the patron's credit card. In still other embodiments, operator server 140 may send to POS terminal 110 the credit card data of the patron, such that POS terminal 110 of the establishment may perform the charging operations; and optionally, POS terminal 110 may add a convenience fee to the charged amount, and/or may transfer the added convenience fee to an account associated with operator server 140.

The present invention may be able to detect and handle a situation in which the patron begins utilizing the solution offered by the present invention, yet fails to complete the required process from the patron's side, for example, due to lack of knowledge, due to a technical problem (e.g., sudden lack of wireless connection, or lack of battery power in smartphone 150), and/or due to human factors (e.g., the patron left the establishment and forgot to close his tab and pay; or the patron exited the establishment intentionally without closing his tab or paying). For example, POS terminal 110 may store an open tab, associated with a unique code provided by the patron. If the patron fails to complete the operations required on his side, then a waiter may instruct POS terminal 110 to initiate a process that closes the tab and automatically charges the patron's credit card. For example, POS terminal 110 may send a message to operator server 140, indicating that the tab of the patron, identified via the unique code, is now being closed at the initiative of the establishment, and further indicating the total amount due. Operator server 140 may receive the message; and may perform or initiate a process (e.g., similar to the charging process(es) described above) to charge the credit card that the patron had previously provided to operator server, and to ensure that the establishment of POS terminal 110 receives the amount due for the closed tab. In some embodiments, operator server 140 and/or POS terminal 110 may automatically add, and caused to be charged, an additional fee, handling fee, convenience fee, service fee, gratuity or "tip", or other surcharge, which may be, for example, a fixed amount (e.g., three dollars per tab or per payment), a percentage amount (e.g., ten percent of the total amount of the tab, with or without sales tax or VAT), a combination of fixed amount and percentage amount, or may be based on other formula (e.g., possibly waiving a service fee if a patron frequently visits the establishment; or possibly adding a smaller or larger amount of gratuity based on the total amount of the tab paid).

Data transferred from POS terminal 110 to operator server 140, and/or data transferred from smartphone 150 to operator server 140, may include a value of the total amount due by the patron to the establishment. Optionally, the data transferred to operator server 140, from POS terminal 110 and/or from smartphone 150, may include a detailed list of the items ordered by the patron together with their corresponding prices, and/or indications of other items which may be relevant for calculating a total amount due and/or for charging the patron's credit card. Such additional data may include, for example, a percentage rate or a monetary amount of an applicable sales tax or an applicable Value Added Tax (VAT); a percentage rate or a monetary amount of a gratuity or "tip"; data about any relevant surcharges which may apply (e.g., a surcharge for a table having six or more diners); or the like. Optionally, such data may be stored by operator server 140 in a database, thereby allowing tracking, monitoring and/or data mining with regard to such data, for example, in order to identify food items that a particular patron may be more likely or less likely to order, in general or in a particular establishment or in a particular type of establishments (e.g., in bars, in restaurants, in convenience stores). Analysis results or other data mining insights produced by operator server 140 may be utilized by operator server 140 for marketing, advertising and/or promotions.

In a demonstrative example, data mining or analysis by operator server 140 may indicate that a particular patron tends to frequently order a Cosmopolitan drink in establishments that are bars, for example, because the patron ordered such drink in his last four visits to a certain bar (or to multiple bars). Accordingly, once operator server 140 receives an indication that the patron enters a particular bar, a location-based and patron-tailored promotion may be provided by operator server 140. For example, operator 140 may send a message to smartphone 150, urging the patron to purchase a Cosmopolitan drink; and optionally providing a discount code or coupon or other promotion (e.g., a "two for one" promotion) if the patron performs such suggested purchase at that establishment within a pre-defined time period (e.g., within the same calendar day, or within one hour).

In another demonstrative example, analysis by operator server 140 may indicate that a particular patron has paid for coffee in six out of her eight most-recent visits to a particular restaurant (or, to a certain chain of restaurant). Accordingly, once operator server 140 receives an indication that the patron enters a particular convenience store (or, an establishment of a similar type, such as a supermarket or food store), a location-based and patron-tailored promotion may be provided by operator server 140, to the patron and/or to the establishment. For example, operator server 140 may send a message to POS terminal 110 of the establishment, urging the salesperson of the establishment to offer to that patron to purchase coffee with discount.

Other suitable types of marketing, advertising and/or promotion operation may be performed, towards the patron and/or towards the establishment, based on analysis of the data aggregated by operator server 140.

POS terminal 110 may include, for example, a transceiver 111, a tab opening module 112, a tab management module 113, a tab closure module 114, a local payment module 115, a remote payment module 116, an abandoned tab detector 117, an abandoned tab handler 118, a unique code receiver 119, a unique code database 120, a tab associator module 121, a scanner unit 122, an item recommendation module 123, and/or other suitable components and/or modules which may be implemented by using hardware and/or software.

Transceiver 111 may include, for example a wireless transceiver, a wired transceiver, or other suitable networking unit (e.g., a Network Interface Card (NIC) or modem) able to send and receive communication signals. Transceiver 111 may allow POS terminal 110 to exchange messages, signals, and/or other communications with other components of system 100, over one or more wired links and/or wireless links.

Tab opening module 112 may create a new tab for a patron, for example, a new "purchase tab" or a new "order tab" for a new patron who visits the restaurant. The new purchase tab may be opened prior to being linked to a smartphone of the patron; or, substantially together with being linked to a smartphone of the patron.

Tab management module 113 allows waiter or a restaurant employee to add items to the tab (e.g., items ordered by the patron), to remove items from the tab (e.g., an item that the patron ordered and then requested to cancel), to edit items on the tab (e.g., changing a component or ingredient in an item), to add a surcharge to a tab or to a food item (e.g., a large party fee, or a wine opening ("corkage") fee, or the like), to give a discount on a tab or on a food item (e.g., discount to an employee of a certain organization, discount to a patron who complained about a problem), or the like.

Tab closure module 114 may allow the waiter or restaurant employee to close a previously-opened tab, and may further generate, produce and/or print a bill or a check for that tab, showing the items ordered and the total amount due.

Local payment module 115 may process a local payment by the patron directly to the restaurant, for example, if the patron tenders cash, if the patron pays by personal check, or if the patron pays by providing a tangible (e.g., plastic) credit card or a tangible (e.g., plastic) debit card to be charged or debited.

Remote payment module 116 may receive message(s) from remote operator server 140 indicating that a particular purchase tab has been paid for, or settled, via an electronic payment arranged remotely between operator server 140 and the patron, or via an electronic payment arranged remotely between operator server 140 and smartphone 150 of the patron. In response, remote payment module 116 may locally mark that open tab as "closed and paid".

Abandoned tab detector 117 may detect that a patron has left the restaurant without paying for his open purchase tab. Optionally, the detection may be based on geo-location of a smartphone of that patron, which has been associated with such open purchase tab. Optionally, abandoned tab detector 117 may be configured to determine that an opened tab has been abandoned if one or more conditions hold true, for example, if a predefined time period (e.g., five hours) elapsed since the tab was lastly updated or modified.

Abandoned tab handler 118 may initiate a process for remote electronic payment from a patron's account at operator server 140, to the restaurant, in response to detection of an abandoned purchase tab.

Unique code receiver 119 may receive from operator server 140 a message indicating a unique code (e.g., a string of letters and/or digits and/or characters) associated with smartphone 150.

Unique code database 120 may store multiple unique codes that are associated, respectively, with smartphones of multiple patrons that are visiting the restaurant or that visited the restaurant recently (e.g., today, or in the past four hours), thereby allowing POS terminal 110 to be concurrently and/or simultaneously utilized in conjunction with multiple smartphone-using patrons.

Tab associator module 121 may create and maintain a link or association between a smartphone of a patron and a purchase tab of the patron, based on the unique code that POS terminal 110 received from operator server 140. Optionally, the link may be temporary or time-sensitive, and may automatically expire (or be deleted or canceled) after a predefined period, for example, within six hours of link creation. The link may also automatically expire or may be automatically canceled upon settlement of the open purchase tab, through remote electronic payment and/or through local payment.

Scanner unit 122 may be an optional component, which may be an integral or integrated part of POS terminal 110, or may be detached from POS terminal 110, or may be detachably-attached to POS terminal 110, or may be connected to POS terminal 110 via wired link and/or wireless link. Scanner unit 122 may include a scanner, a sensor, a camera, an image acquisition unit, a barcode reader, or other scanning component. Scanner unit 122 may be used by an employee of the restaurant in order to scan or photograph a display unit (e.g., a screen) of smartphone 150 which may display the unique code for linking smartphone 150 with a purchase tab. Optionally, scanner unit 122 may include, or may be associated with, image recognition and/or image analysis software, or Optical Character Recognition (OCR) module or software, able to recognize characters from the captured image. POS terminal 110 may allow a waiter to enter the unique code in other suitable ways, for example, by entering data through a keyboard, a keypad, a virtual or on-screen keyboard, a virtual or on-screen keypad, by uttering the code as voice or audio and using voice recognition or audio analysis or speech-to-text converter, and/or other suitable input methods.

Item recommendation module 123 may receive from operator server 140 indication(s) of one or more preferred products, that a particular patron having smartphone 150 (e.g., associated via a unique code with a purchase tab) has preferred in past visits to this restaurants, and/or to other restaurants or establishments (e.g., in general, or of the same type as the current restaurant). Optionally, item recommendation module 123 may receive from operator server 140 indication(s) of preferred products that a patron having a smartphone prefers, even if her smartphone was not yet linked or associated with an open purchase tab at the restaurant. For example, operator server 140 may detect that a previously-registered user of operator server 140 is now visiting the restaurant; and even though such user has not yet requested to link her smartphone with this restaurant, operator server 140 may already provide item recommendations to POS terminal 110 of that restaurant.

Operator server 140 may include, for example, a transceiver 141, a customer profile database 142, a customer transaction database 143, an establishment database 144, a payment method information database 145, a payment module 146, a payment execution module 147, an associator module 148, item recommendation module 149, and/or other suitable components and/or modules which may be implemented by using hardware and/or software.

Transceiver 141 may include, for example a wireless transceiver, a wired transceiver, or other suitable networking unit (e.g., a Network Interface Card (NIC) or modem) able to send and receive communication signals. Transceiver 141 may allow operator server 140 to exchange messages, signals, and/or other communications with other components of system 100, over one or more wired links and/or wireless links.

Customer profile database 142 may store data about registered consumers or patrons who utilized, or who request to utilize, the electronic payment process that is provided by operator server 140. Such data may include, for example, personal information provided voluntarily by the user (e.g., first name, last name, age, age range, gender, home address) and/or information obtained by other means (e.g., type or model of mobile phone utilized by the user), as well as other optional information (e.g., user-defined preferences with regard to which recommendations or promotions to receive).

Customer transaction database 143 may include data describing prior transactions, purchases and/or orders made by each registered consumer. The data may include, for example, names of establishments visited by the consumer and the date and time of such visits (e.g., "The Octagon Bar" on Mar. 5, 2011 at 7:14 PM); type(s) of establishments visited by the consumer (e.g., "convenience store", "restaurant", "bar", "gas station store", "hotel lounge"); a list of items ordered or purchased, and their respective prices; indication of whether or not the consumer has used the electronic payment method in past visit(s) (or, for example, opted to pay with cash or by tendering a plastic credit card even though the consumer has associated his smartphone with a purchase tab); or the like. Optionally, customer transaction database 143 may be implemented as a portion or a segment of purchase history, within another database, for example, within customer profile database 142.

Establishment database 144 may store data describing each establishment that registered with operator server 140. Such data may include, for example, establishment name, establishment address, type of establishment, days and/or time in which the establishment is open to the public (e.g., in order to determine whether or not to suggest to nearby consumers to visit the establishment), type of items offered by the establishment (e.g., food, drinks, alcohol products, cigarettes, newspapers), types of promotions that the establishment indicated that it may consider performing (e.g., "two-for-one" promotion; "buy one, get one at half price" promotion; a discounted price promotion in percentages; a discounted price promotion in monetary amount), and/or other suitable data.

Payment method information database 145 may securely store, for example, information required for processing electronic payment by a customer. Such data may include, for example, credit card type, name on credit card, expiration date, security code, or the like.

Payment module 146 may include a module to electronically pay to a business establishment for a purchase tab using payment method information of a consumer having a smartphone (or other mobile device) and who requested to associate his smartphone with his purchase tab at the establishment, for example, via a unique code sent by operator server 140 to the smartphone and then shown or conveyed by the consumer to a restaurant employee who enters the code into POS terminal 110 of the establishment.

Payment execution unit 147 may be part of payment module 146, or may be associated therewith. Payment execution unit may perform electronic payment to the business establishment, responsive to a wireless signal received from the smartphone indicating a command of the consumer to perform the electronic payment. Additionally or alternatively, payment execution unit may perform electronic payment to the business establishment, responsive to a signal received from the business establishment (e.g., from POS terminal 110) indicating a request of the business establishment to perform the electronic payment and without receiving a payment command from the smartphone of the consumer (e.g., if the establishment detected that the consumer has left the establishment without paying).

Associator module 148 may be able to receive a message from smartphone 150, indicating that the consumer who utilizes smartphone 150 is visiting the business establishment; and may be able to generate a unique code or string, temporarily associating or linking that smartphone 150 of that consumer to a purchase tab associated with the consumer at the business establishment.

Recommendation module 149 may analyze data of items previously purchased by the consumer, and may identify an item preferred by the consumer, and to send a recommendation message to POS terminal 110 of the business establishment indicating that the item is preferred by that consumer. Optionally, item recommendation module 149 may analyze the data of items previously purchased by the consumer, may identify an item previously preferred by the consumer, and may send a recommendation message to the smartphone of that consumer indicating that this preferred item is offered at the business establishment currently being visited by that consumer. Optionally, a recommendation message may include a promotional component related to the item (e.g., a coupon, a discount code, a promotion code, a barcode).

Smartphone 150 may be any suitable type of mobile device, portable electronic device, gaming device, tablet, Personal Digital Assistant (PDA) device, wireless communication device, or other suitable consumer electronic device. Smartphone 150 may include, for example, a GPS receiver 151, a wireless transceiver 152, an input unit 153, an output unit 154, one or more applications 155, a remote payment application 159, and a consumer club application 192.

GPS receiver 151 may include a receiver able to calculate geo-spatial location based on line-of-sight with multiple satellites, or another suitable component able to estimate or determine geo-spatial location based on other parameters.

Wireless transceiver 152 may include, for example, a 802.11 transceiver or "Wi-Fi" transceiver, a 802.16 transceiver or "Wi-Max" transceiver, a cellular transceiver (e.g., 4G or 3G transceiver), or other suitable transceiver able to send and receive wireless communication signals.

Input unit 153 may include, for example, a physical keyboard, a virtual keyboard displayed on a touch-screen, a stylus or pen, a touchpad, a microphone, or the like.

Output unit 154 may include, for example, a display unit, a screen, a touch-screen, a multi-touch screen, one or more speakers, or the like.

Applications 155 may include, for example, one or more communication applications, or other applications for a smartphone, mobile device, or the like. Remote payment application 159 may be or may include a dedicated or general-purpose application which may be pre-provided with smartphone 150, or may be downloaded to smartphone 150 (e.g., from the Internet, from an online application store or application market), or may be otherwise installed into smartphone 150. Optionally, a dedicated application (e.g., remote payment application 159) may be distributed (for free, or for a price) by the owner or administrator of operator server 140 in order to allow users to register with operator server 140 and to allow such registered users to utilize the electronic payment process provided by operator server 140.

Smartphone 150 may transmit to server operator 140 an indication of an identity of a business establishment in which smartphone 150 is located. In response, smartphone 150 may receive from operator server 140 a unique code temporarily linking smartphone 150 with a purchase tab associated with that consumer (who utilizes smartphone 150) at that business establishment.

Optionally, smartphone 150 may first receive a command from the consumer to pay for her purchase tab; and only then, smartphone 150 may transmit the linking request to operator server 140.

Smartphone 150 may wirelessly transmit payment method information exclusively to operator server 140, which may be located externally to the business establishment visited by the consumer; and smartphone 150 may avoid transmission of payment method information to a receiver within the business establishment.

Smartphone 150 may utilize GPS receiver 151 to determine a geo-spatial location of smartphone 150; and may further determine the identity of the business establishment based on the geo-spatial location of smartphone 150, for example, by utilizing a local or remote director or mapping service or landmark service. Optionally, smartphone 150 may wirelessly transmit the geo-spatial location information to operator server 140, and may wirelessly receive from operator server 140 a list of one or more candidate establishments located in proximity to that geo-spatial location. Then, input unit 153 may receive a user selection of the relevant business establishment from the list of candidate establishment(s) presented to the user via output unit 154.

Smartphone 150 may include other suitable components, for example, a processor (e.g., a general purpose processor, a specific processor, a controller, a Central Processing Unit (CPU), circuitry, an Integrated Circuit (IC), a logic component, a single-core or multiple-core processor, or the like); a memory unit (e.g., phone memory; Secure Digital (SD) card; SIM card; Flash memory; volatile memory; non-volatile memory; RAM; or the like); a storage unit (e.g., a Flash storage unit, a miniature hard disk, a SIM card, non-volatile storage); an antenna; one or more cameras; an Operating System (OS); one or more input/output ports (e.g., a USB port, an HDMI port, an earphone socket); a Bluetooth transceiver or component; an Infra-Red (IR) transceiver or component; or the like.

Waiter portable terminal 170 may be an optional accessory or device able to wirelessly communicate with POS terminal 110, and/or able to perform one or more functions that POS terminal 110 may perform, while being portable and mobile. For example, waiter portable terminal 170 may allow a waiter to open a new tab, take orders, modify a tab, close a tab, or the like. Optionally, waiter portable terminal 170 may include an input unit (e.g., physical keyboard, physical keypad, virtual on-screen keyboard, virtual on-screen keypad, touch-screen) that a waiter may use in order to enter a unique code, shown to the waiter by a consumer on her smartphone, the unique code temporarily linking the smartphone of the consumer to her purchase tab at the establishment. Optionally, waiter portable terminal 170 may include a scanning unit or scanner able to capture an image of the unique code (displayed on the smartphone), process it (e.g., using OCR or other technique), and extract the unique code. The unique code may be sent wirelessly from the waiter portable terminal 170 to POS terminal 110, and in response, POS terminal 110 may link the identified smartphone to the corresponding purchase tab (e.g., based on the waiter indicating manually, or inputting, which table or party or consumer is associated with that smartphone, such as, "Table 5" or "Tab 17", or the like).

In accordance with the present invention, a consumer may elect to link her smartphone to a purchase tab, but then, to avoid payment by the remote electronic process, and to opt for paying locally, for example, by tendering cash or a tangible credit card. In such case, POS terminal 110 may locally close the purchase tab and may locally send a signal to operator server 140 that the tab has been settled locally and that remote payment is not required for this tab.

Optionally, the patron may split a tab between local payment and remote payment. For example, the patron may utilize his smartphone 150 to command closure of the tab; to see that the total amount due is 35 Dollars; to command through smartphone 150 that 20 Dollars be paid electronically via his credit card, and that the remaining 15 Dollars (with an optional gratuity amount) be paid locally by the user (e.g., via cash, or by tendering a physical credit card to a waiter). Optionally, this mechanism may be used in order to split a common bill or tab between two consumers.

The present invention may allow multiple consumers with multiple respective smartphones (or other mobile devices) to share a unified tab and/or to pay portions of a unified tab. For example, Adam and Eve may dine out together, Adam carrying his smartphone and Eve carrying her tablet. Each one of them may request and receive a unique code for his or her mobile device. In some embodiments of the present invention, the waiter may keep two separate purchase tabs corresponding to their two unique codes and mobile devices, such that each one of Adam and Eve pays separately for his or her own items. In other embodiments of the present invention, the two unique codes may be associated with a single purchase tab common to both Adam and Eve; and they may later decide between them, which one of them will utilize his or her mobile device in order to pay the entire tab. Alternatively, Adam may pay 70% of the tab and Eve will pay 30% of the tab, and their mobile devices may be utilized in order to command the operator server 140 to process these two electronic payments at this ratio. Optionally, one of Adam and Eve may utilize remote electronic payment to pay a portion of the unified tab, while the other person may tender cash or a tangible credit card in order to pay for the remainder portion of the unified tab. Other suitable payment mechanisms may be used.

The present invention may allow rapid and efficient creation of a "Consumer Club" for a business establishment, including for small-size business establishments (e.g., a local diner, a single-branch restaurant, a local store, or the like). For example, operator server 140 may identify that Adam is visiting a particular restaurant, and may ask Adam via his smartphone whether Adam would like to join a Consumer Club of that restaurant and thus receive various promotions. If Adam responds positively, operator server 140 may send to Adam's smartphone a coupon or a promotion code pre-defined by the establishment as an incentive for new Consumer Club members. Operator server 140 may keep record of Consumer Club members and their personal information and transaction history, for example, in a Consumer Club database 191 associated with each particular establishment. Upon a subsequent visit of the club member to that establishment, operator server 140 may detect that the visitor is already a club member, and may thus automatically provide the patron with suitable benefits. Optionally, the data in Consumer Club database 191, or a portion thereof, may be accessible by the establishment, or may be browsed or searched by the establishment, for further marketing purposes.

In some embodiments, joining such Consumer Club may be free; whereas in other embodiments, it may require a one-time fee, or a periodically-recurring fee (e.g., monthly fee or annual fee). Furthermore, an establishment may offer more than one type of Consumer Club to various groups of patrons; for example, a "silver" Consumer Club that provides certain benefits to all patrons for free; a "Gold" Consumer Club that provides increased benefits to patrons that paid a monthly membership fee; and a "Platinum" Consumer Club that provides even higher benefits to patrons that meet certain conditions (e.g., purchased from the establishment more than a threshold monetary value per year; are employees of the establishment or of a particular organization). Optionally, a Consumer Club application 192 may run on smartphone 150, as a stand-alone application or as part of an application used by operator server 140 for remote electronic payments.

The present invention may allow an establishment to efficiently initiate and manage a Deals scheme in an electronic or digital format. For example, a coffeeshop may provide each patron a paper ticket having ten squares, and may stamp one square each time the patron purchases a coffee; such that upon stamping all ten squares, the patron may receive a free item by tendering his paper ticket to the coffeeshop. This mechanism may be replaced by a digital system enabled by operator server 140 and/or POS terminal 110, which may track the purchases done by a patron, and may provide an incentive upon completion of the required quota of purchases. In some embodiments, a purchase may provide "virtual points" to a patron; and multiple patrons sharing a unified tab may split the virtual points evenly among them, or may allocate virtual points to each patron based on the items that he ordered, or based on the order in which patrons joined the table to the unified tab (e.g., in a party of three patrons that ordered two coffees, the first two patrons that joined may receive the virtual points for the two coffees). Optionally, virtual points may have an expiration date. In a subsequent visit of the patron to the establishment, system 100 may check whether or not he is entitled to a promotion based on his previous purchases (e.g., reached an accumulation of ten coffees purchased already), and may offer to the patron (through his smartphone 150) whether or not to accept the offered promotion (e.g., a free sandwich). If the patron accepts the offer, then smartphone 150 may display a unique string which the patron may show to the waiter; and in response, the waiter may order the promotional item. In such case, based on the unique string allocated to that smartphone 150 for the earned promotion or deal, POS terminal 110 may identify the record of that patron and may reset the number of virtual points due to the fulfillment of the benefit. Optionally, the establishment may share with server operator 140 a list of products offered by the establishment, in order to allow the operator server 140 to provide to the patron a particular product as the benefit or promotion. Similar mechanism may be used for various types of promotions or deals, for example, a discount on a subsequent purchase, a free item, a gift card, or the like. Optionally, a deal management module 193 may be part of operator server 140, or a deal management module 194 may be part of POS terminal 110, in order to manage and track such deals and promotions for an establishment.

The present invention may be used in order to implement new types of Deals, promotions, digital or electronic "punch-cards", or digital or electronic loyalty clubs or customer clubs, which may span more than a single establishment or which may be cross-merchant or cross-establishment in their nature. In some embodiments, system 100 may allow efficient implementation of a digital "punch card" which may be similar to traditional paper-based cards, such that for any type of coffee that the patron orders (e.g., brewed coffee, espresso, latte, or the like) a marking is virtually marked ("punched"), regardless of the type of coffee ordered. In other embodiments, an establishment or merchant (e.g., coffeeshop) may easily define that one digital punch-card be used to accumulate virtual markings of regular (brewed) coffee, whereas a separate digital punch-card be used to track espresso drinks, and a third separate digital punch card may track the purchases of iced drinks (or alcoholic beverages, or the like); and management and tracking of multiple punch cards, per patron, may be efficiently performed. In yet other embodiments, cross-merchant or cross-vendor functionality may be achieved; for example, system 100 may track the purchases that a patron performs using his smartphone 150 and the remote electronic payment route, and may digitally mark one virtual marking ("punch") in a virtual punch-card every time that the patron ordered a Sprite drink, even if the purchases were performed at different establishments that typically run their own punch-card schemes; thereby allowing to identify repeated purchases of a particular product by a loyal customer across multiple and unconnected merchants over time, possibly rewarding such customer for her repeated purchases, for example, e.g., by one of the establishments, or by a manufacturer of the preferred product, or by the last establishment who virtually punched the last marking in the series. Other suitable virtual punch-card schemes may be used, as well as single-merchant schemes and/or cross-merchant schemes; and operator server 140 may utilize a dedicated module or component to manage and/or run such schemes, for example, a cross-merchant deal management module 196.

The present invention may allow an establishment to easily implement a Gift Card program, which may be entirely digital or electronic in its nature. For example, an establishment may utilize a gift card management module 195 of POS terminal 110 in order to define one or more gift cards which may be electronically offered to patrons through their smartphones. Such offering may be specific to the establishment; or to a chain associated with the establishment; or may be general to all establishments (or a subset of establishments) that operate in conjunction with operator server 140. Optionally, a gift card may be defined to have an added value as an incentive to purchase gift cards, together with an expiration date for the promotional added value; for example, "purchase a 20 Dollar gift card to Triangle Coffeeshop by June 15, and get additional 3 dollars value on your gift card".

The patron may utilize a gift card module 196 on his smartphone 150, which may be a portion of a general application provided by operator server 140, in order to purchase and/or utilize such gift cards. For example, the patron may view on her smartphone 150 the gift card offerings that were defined by various establishments; may purchase a gift card, or may send an invitation to a friend to purchase a gift card, or may purchase a gift card and request that the credit balance of the gift card be attributed to a friend. Optionally, a user may receive a gift card by performing certain pre-defined operations (e.g., purchasing products at a minimum total value; referring a certain number of friends to join the service and/or to perform transactions through the system; or the like). A purchase gift card may be reloaded with more funds, using smartphone 150; and may appear to the user of smartphone 150 as one of a set of user-defined payment methods (e.g., similar to a credit card or debit card whose information the patron already entered to smartphone 150 and transmitted to operator server 140).

In some embodiments of the present invention, credit card information or other payment method information may be stored exclusively in a secured storage of operator server 140; and may not be shared with, or known by, the establishment or its POS terminal 110; and may not be stored locally by smartphone 150 of the patron. This architecture may provide security and privacy, may minimize fraudulent usage of the payment method information; may alleviate risks associated with losing of a smartphone or fraudulent actions by an establishment's employees; and may provide increased security to patron's payment method information.

Components and/or modules (e.g., consumer club module, gift card module, punch card module, loyalty club module, history tracking module, or the like) which may be shown herein, or may be described herein, as appearing in a particular device of system 100, may optionally be implemented (additionally or alternatively) in other device(s) of system 100. This may provide system 100 flexibility in implementation, for example, by utilizing an off-the-shelf or conventional POS terminal which may receive various services or solutions from the remote operator server 140; and/or a dedicated or proprietary POS terminal which may integrate therein one or more of the functionalities or modules described herein, or vice versa.

It is noted that some or all of the communication links, that are indicated with arrows in FIG. 1A, may be optional and are shown for demonstrative purposes. In some embodiments, smartphone 150 may not be able to communicate directly with POS terminal 110, but rather, only through operator server 140. In some embodiments, POS terminal 110 may not be able to communicate directly with smartphone 150, but rather, only through operator server 140. In other embodiments, optionally, smartphone 150 and POS terminal 110 may be able to directly communicate between them. Similarly, smartphone 150 and waiter portable terminal 170 may not necessarily be able to communicate between themselves directly.

The term "phone" as used herein may include, for example, a cellular phone, a cellphone, a smartphone, a handheld device, a portable wireless device, a mobile communication device, a tablet, an electronic book (e-book) reader, a portable device capable of wireless communication, a handheld device capable of wireless communication, or the like.

The terms "patron" or "consumer" as used herein may include, for example, a customer, a client, a user, a visitor, a person who is required or expected to make a payment to a vendor of goods and/or services, a person who desires to make a payment to a vendor of goods and/or services, or the like.

The terms "establishment" or "business establishment" or "vendor" as used herein may include, for example, a merchant, a vendor, a restaurant, a bar, a diner, an eatery, a kiosk, a lounge, a shop, a store, or other suitable establishment which may offer (e.g., to the public, or to members) food items, drinks, entertainment, or other goods and/or services.

Figure 2:
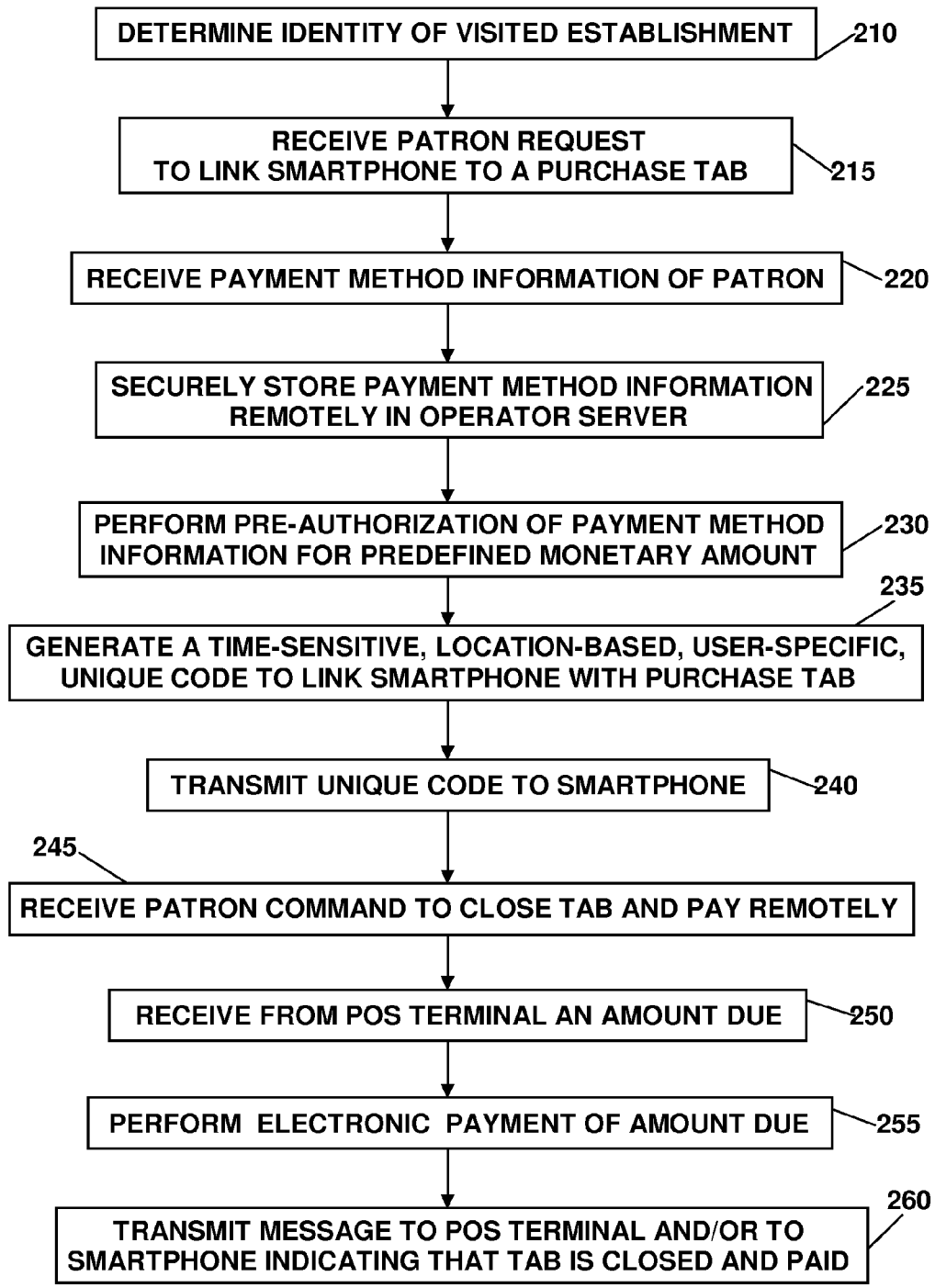
FIG. 2 is a schematic flow-chart diagram of a method of electronic payment, in accordance with some demonstrative embodiments of the present invention.

Reference is made to FIG. 2, which is a schematic flow-chart diagram of a method of electronic payment, in accordance with some demonstrative embodiments of the present invention. The method may be implemented, for example, by system 100 of FIG. 1A, or by one or more components thereof.

The method may optionally include, for example, determining an identity of an establishment being visited by a patron having a smartphone (block 210). This may be performed, for example, by the smartphone and/or by the operator server, based on location information (e.g., smartphone GPS data, correlated with mapping information or business directory).

The method may optionally include, for example, receiving a patron request via his smartphone, to link his smartphone to a purchase tab of the establishment (block 215).

The method may optionally include, for example, receiving payment method information (e.g., credit card data) of the patron (block 220); securely storing the payment method information remotely in the operator server (block 225); and performing pre-authorization of the payment method information for a predefined monetary amount (block 230). It is noted that in some embodiments, operations may be performed in other suitable order; for example, the method may firstly receive payment information from the patron (e.g., initially and even before the patron visits an establishment); and only later perform the process to link between the smartphone and a purchase tab (e.g., upon the patron visiting the establishment); and the pre-authorization of the payment method information may be performed at one or more suitable points in time (e.g., upon initial registration of the patron; upon firstly receiving from the patron the payment method information; upon identifying that the patron visits an establishment; upon receiving a patron request to link her smartphone to a purchase tab; or the like).

The method may optionally include, for example, generating a time-sensitive location-based user-specific unique code (block 235); and wirelessly transmitting the unique code to the smartphone of the patron (block 240). The patron may receive the unique code on his smartphone; may show or tell the unique code to the waiter; and the waiter may enter the unique code into a POS terminal of the establishment, to link the smartphone of the patron with a new purchase tab or with a previously-created and currently-open purchase tab. The purchase tab may then be managed by the waiter, for example, by adding to the tab items that the patron orders.

It is noted that the method may include other and/or additional operations, which may not necessarily be shown in FIG. 2 in order to maintain clarity and simplicity. For example, after the operation of block 240, the patron may manually show (or convey, or tell) the unique code to the waiter; the waiter may manually enter the unique code that the patron showed him, to the POS terminal in order to associate between the patron and the relevant purchase tab; the POS terminal may send a query to the remote operator server, to find out whether or not the unique code is valid, and optionally to request additional information about the patron; if the unique code is not valid (e.g., not validated by the remote operator server), then no linkage and no association will be created between the patron's smartphone and the purchase tab; if the unique code is valid (e.g., is validated by the remote operator server), linkage or association may be established between the purchase tab managed on the POS terminal, and the patron's smartphone, and further, patron information may be transferred from the remote operator server to the POS terminal. Furthermore, as long as the purchase tab is open, the POS terminal may optionally send to the remote operator server updates and/or modifications to the purchase tab, such as, for example, addition of new items, removal of canceled items or returned items, discounts applied, surcharges applied, or the like. Additionally, while the purchase tab is open, the POS terminal may further query the remote operator server regarding discounts and promotions that were applied in the past to that patron.

The method may optionally include, for example, receiving a command from the patron, via his smartphone, to close the tab and pay via remote electronic payment (block 245).

The method may optionally include, for example, receiving from the POS terminal of the establishment at least a total amount due for the purchase tab of that patron (linked to the tab by the unique code) (block 250); and performing the electronic payment of at least that amount, by using the previously-received payment method information of that patron (block 255), such that the establishment's account may be credited by the amount due for the tab. This may include, for example, performing clearing or defrayal of the credit card or debit card previously provided by the patron.

The method may optionally include, for example, transmitting a message to the POS terminal of the establishment, and/or to the smartphone of the patron, indicating that the tab is closed and paid (block 260).

Optionally, the remote operator server may then process the new items that the patron has just purchased and paid for. Such processing may include, for example, updating a relevant promotion data segment or deals data segment, updating one or more virtual punch-cards based on the purchased made and paid for, identifying the eligibility of the patron for a promotion based on the added purchases, or the like.

Other suitable operations may be used, in accordance with the present invention.

The present invention may further provide devices, systems, and methods of customer-based transaction processing.

Applicants have realized that from a Merchant's business perspective, there may be two different types of service providers: a first business provider that provides a service having an added value, and a second business provider that causes capturing of new business (e.g., new customers, new clients, new market segments).

Applicants have realized that some Merchants are slow or not eager to transact with a business provider of the first type, and are reluctant to pay for such "added value services"; mainly due the fact that the Merchants view this as letting go on part of their existing income, regardless of the value which the service may add to them.

Applicants have also realized that on the other end, for services which are perceived by Merchant to be services of the second type (e.g., which bring new customers or new transactions), many Merchants are willing to adopt and pay, mainly due to the fact that such type of services are regarded as bringing in "new revenue" or "new money", and the Merchant has little or nothing to lose by adopting such type of service.

Applicants have realized that some service providers in the field of mobile payments are struggling with low profit margins; whereas other service providers, which operate in the field of marketing (e.g., group-based purchasing) may be enjoying higher profit margins that can reach, for example, 10 to 25 percent or even higher profit margins.

Applicants have realized that mobile payments are still regarded as less-desired services of the first type, and that an opportunity exists to modify the existing systems and methods in order to re-characterize such mobile payments as the more-desired services of the second type and thereby creating a "win win" offering to the merchant.

The present invention may thus provide Customer Based Processing (CBP) of transactions and of mobile payments. The CBP model offers to merchants a cost that is based on distinguishing or differentiating between an "Existing Customer" and a "New Customer", or between a customer who has a "source" or "origin" linkage towards the merchant versus a customer who does not have such "source" or "origin" linkage towards the merchant.

In some embodiments, the mobile payment system may create a "source" or "origin" linkage or association, between a user of a mobile device, and the first merchant that caused or triggered that user to download and/or install the mobile or triggered that user to sign-up or register with the mobile payment application; or, the first merchant who caused or payment system (e.g., create a user profile; enter payment method details such as credit card details); or, the first merchant at which the user has actually used the mobile payment application for purchasing goods and/or services. Other parameters or considerations may be used for determining that an "origin" or "source" linkage should be defined between a mobile device user and a particular merchant (or, a particular chain of merchants).

If a customer performs a mobile payment, at a merchant that is the "source" or "origin" merchant of that customer, then the mobile payment is processed at a reduced processing fee, or at no cost for the merchant (e.g., no merchant-side commission by the mobile payment system administrator, no percentage or fixed amount of the price being deducted as merchant-side transaction fees), and also, at a reduced processing fee or at no cost for the customer (e.g., no customer-side commission by the mobile payment system administrator, no percentage or fixed amount being added as customer-side transaction fees). For such customer, who performs a mobile payment transaction at an "origin" or "source" merchant, the mobile payment service is provided for free, at no cost to the merchant and/or to the existing customer, or at a processing fee that is reduced relative to regular processing fees. The free service ensures that the merchant is eager to adopt the mobile payment system, since no processing costs or processing fees are applied when an existing customer of the merchant makes a transaction with the merchant through the mobile payment system.

In contrast, if the user performs a mobile payment at any other merchant, namely, any merchant other than the merchant that is regarded as "origin" or "source" for that user (or, the chain of such merchant), then, the mobile system charges a regular (or increased, or non-discounted, or non-reduced) processing fee or transaction fee (or commission, which may be percentage based and/or fixed amount). Merchants are still eager to adopt the mobile payment system, as they are paying a transaction fee or processing fee only for "new business".

The present invention allows to associate between a mobile device user and a merchant-of-origin (or, a group or chain of merchant that are regarded as origin for the user), which may be regarded as a "source", and may take into account a current location of a user in order to determine the processing fee that will be charged (e.g., zero fee if the customer is transacting with the referring merchant, or regular fee if the customer is transacting with other merchants).

In a first example, a customer Adam visits a restaurant named Bob's Diner. During his visit, Adam is offered to use the mobile payment system of the present invention as described in detail above. Such offer may arrive to Adam from a waiter, a flyer, a QR code, a mail invitation, an email invitation, a social media posting, a social media page or link, a menu of the restaurant, a table stand, or the like and may or may not offer an incentive to use the mobile payment application for the first time. Adam decides to sign up; he downloads or otherwise installs the mobile payment application on his electronic device (e.g., smartphone or tablet), and he signs up (e.g., creates a new user profile or user account). As a result, the mobile payment system now associates Adam with the establishment (Bob's Diner) that caused Adam to join (or to sign up to) the mobile payment system. Therefore, from that moment and onward (e.g., indefinitely, or for a pre-defined time period, for example, 12 months), mobile payments from Adam to Bob's Diner will be processed at no cost, namely, without charging a processing fee (or transaction fee, or other commission) to Adam and/or to Bob's Diner. Moreover, if Bob's Diner is actually a part of a chain of merchants (e.g., a chain of restaurants named Bob's Diner, having multiple branches or locations), then the same no-cost processing may apply to all future purchases of Adam at all other branches of that particular chain. As a result, the mobile payment system operates at no cost to the merchant and to the customer, as if cash is processed; and the merchant (Bob's Diner) is satisfied since he provided a value to his customer (by allowing Adam to pay via Adam's mobile device) while the merchant is not charged any processing fees or transaction fees (which typically range between 1 to 4 percent).

In a second example, Adam is already an active user of the mobile payment system, and is already associated with the merchant Bob's Diner which elicited Adam to sign up. Adam now visits a different establishment, for example, Carl's Eatery. Adam is not associated with Carl's Eatery, and therefore Adam may be regarded as a new customer to Carl's Eatery, and the mobile payment system may debit a processing fee or a transaction fee (or other suitable commission or debit, which may be merchant-side and/or customer side) on purchases that Adam performs at Carl's Eatery. For example, Adam may pay 10 Dollars through the mobile payment system; the mobile payment system may keep 1 Dollar (ten percent) as commission or processing fee, and may transfer 9 Dollars (ninety percent) to the merchant, Carl's Eatery. The merchant may be satisfied, for example, since a new customer (Adam) transacted new business with the merchant, and the merchant paid a modest commission (e.g., ten percent in the above example) for such new business, instead of paying a higher commission (e.g., 25 or even 50 percent) to other services that bring new customers (e.g., group purchases, which might damage the image or brand of the merchant).

The system may utilize one or more suitable ways in order to associate between a customer (a user of a mobile device) and a "source" (e.g., the first merchant that elicited the customer to sign-up for the mobile payment system). In some implementations, the mobile payment system may utilize an application for a mobile device, which may be downloaded from an application store. Every merchant that joins the mobile payment system may receive a "link package" (e.g., unique digital items and/or printed items) that may comprise a link to the merchant's business and/or an indication associating the mobile payment system with that particular merchant. A customer who utilizes that unique link, may be redirected to the download page of the mobile payment application, and during the sign-up process the mobile payment system may register an association linkage between the new customer who joined the system and the merchant that referred the new customer. This may cause an indefinite association (or, a long-term association) between the new customer and the referring merchant.

The link package may include digital items, for example, a code patch (e.g., an HTML or JavaScript code) that the merchant may place on its website, optionally associated with an image or banner or button having the referral link; a hyperlink, a share or post button, a social media plug-in or element, a picture having a QR code or other QR link, a banner, or the like. The link package may include printed items or physical items, for example, a unique QR code that may be printed or used and which has the referral link and the referral details embedded therein; a sticker with QR code or link; a business card or brochure or flyer with QR code or link; or the like. Other suitable ways may be used.

The present invention may utilize a database which stores details of merchants; details of customers; a linkage between a customer and a particular merchant (e.g., the merchant that firstly referred the customer to join the mobile payment system).

The present invention may comprise a mobile payment system, which may charge a first processing fee (e.g., zero fee, or reduced fee) when a customer transacts with the merchant that firstly induced the customer to join the mobile payment system (or with a chain of branches of that particular referring merchant); whereas, the system may charge a second, different, processing fee (e.g., regular fee, or increased fee) when a customer transacts with other merchant(s), namely, non-referring merchants.

The present invention may be used in conjunction with various types of establishments, venues, business entities and/or locations, which may be independently owned and independently operated or may be part of a group or chain of merchants; such as, for example, restaurants, diners, bars, pubs, beauty salons, nail salons, hair salons, or various establishments which may offer various food items and drinks and/or other items or services.

The present invention may be utilized in a full-service establishment, as well as in self-service or partial-service or quick-service establishments, or in any suitable location that has a POS terminal or that has the capability to install a POS terminal, thereby allowing the user to convey to the POS terminal (or to the person that operates the POS terminal, if exists) a unique code that provides a link to the payment card details of the user and allows a quick and convenient checkout process.

The present invention may allow a mobile payment system to provide differential merchant-side processing fees and/or differential customer-side processing fees, based on the determination of whether or not the mobile user and the particular merchant have an "origin" linkage between them. The "origin" linkage may exist, for example, between a user of a mobile device, and the merchant that was the first merchant who induced that user to download and/or install and/or use the mobile payment system, or to firstly register or sign-up with the mobile payment system, or to firstly make a mobile payment via the mobile payment system. Accordingly, transactions performed by the mobile user at his "origin" merchant (or chain of merchants), may enjoy reduced processing fees or zero processing fees.

Some embodiments may include a system or device or server to facilitate electronic payment to a business establishment, the server comprising: a customer profile database to store at least payment method information provided by a consumer; and an associator module (a) to receive a message indicating that said consumer is visiting said business establishment, and (b) to generate a unique code temporarily associating a smartphone of said consumer to a purchase tab associated with said consumer at said business establishment, and (c) to maintain said purchase tab open and accumulating purchased items until said smartphone wirelessly transmits a wireless communication signal indicating a consumer command (A) to close said purchase tab and (B) to automatically pay for accumulated purchased items by using a pre-defined electronic payment method. If the server determines through an abandoned tab module, that the consumer exited the business establishment without closing the purchase tab and without paying for the accumulated purchased items within a pre-defined time period, then the server is to automatically close said purchase tab and to initiate electronic payment to said business establishment from an electronic account of said consumer.

Some embodiments may include a point-of-sale (PoS) terminal for use in a business establishment, the point-of-sale terminal comprising: a tab associator module to temporarily link between (i) a purchase tab of a patron of said business establishment, and (ii) a portable electronic device of said patron; a tab management module to maintain said purchase tab open and accumulating purchased items until said portable electronic device of said patron wirelessly transmits a wireless communication signal indicating a patron command (A) to close said purchase tab and (B) to automatically pay for accumulated purchased items by using a pre-defined electronic payment method; an abandoned tab detector to make a determination that the consumer exited the business establishment without closing the purchase tab and without paying for the accumulated purchased items within a pre-defined time period; wherein, in response to said determination, the point-of-sale terminal is to automatically close said purchase tab and to initiate electronic payment to said business establishment from an electronic account of said patron.

In some embodiments, the point-of-sale terminal may comprise: a tab management module to associate between (A) an open and unified purchase tab, and (B) a first smartphone of a first consumer and a second smartphone of a second consumer; wherein upon receiving, from one of said first smartphone and second smartphone, a command to close said open and unified purchase tab, the tab management module is (a) to close said open and unified purchase tab, and (b) split the unified purchase tab evenly between said first consumer and said second consumer, and (c) collect a first half of the unified purchase tab via a first electronic payment from said first consumer, and collect a second half of the unified purchase tab via a second electronic payment from said second consumer.

In some embodiments, the point-of-sale terminal may comprise: a tab management module to associate between (A) an open and unified purchase tab, and (B) a first smartphone of a first consumer and a second smartphone of a second consumer; wherein upon receiving, from one of said first smartphone and second smartphone, a command to close said open and unified purchase tab, the tab management module is (a) to close said open and unified purchase tab, and (b) split the unified purchase tab unevenly between said first consumer and said second consumer based on a ratio indication received from one of said first and second smartphones, and (c) collect a first portion of the unified purchase tab via a first electronic payment from said first consumer, and collect a second portion of the unified purchase tab via a second electronic payment from said second consumer, wherein the first portion and the second portion have said ratio.

In some embodiments, the tab management module may support division of a tab among two or more customers having two or more (respective) mobile devices by using other division methods; for example, by allowing one of the customers (or some of the customers) to choose items and/or to allocate items to each of the divided portions of the tab; or by allowing users to split or divide the tab based on selection of particular item(s) that each customer ordered and/or consumed. In some embodiments that support division of an open tab, a group of two or more customers may share an open tab; a first customer may perform check-out and may pay autonomously (using his mobile device and using his pre-defined electronic payment method) for particular items on the tab that he ordered and/or consumed (or that he decided to pay for); then, the second (or subsequent) customer that shares the open tab, may see on his mobile device the open tab, without the items that the first customer already paid for (or with those items shown in grayed-out text, or with strike-through, or other visual effect), and may proceed to select the items that he would like to pay for, and then pay for them via his mobile device; and so forth to subsequent customers that share a single tab.

In some embodiments, the point-of-sale comprises means to wirelessly receive a signal from said portable electronic device of said patron, indicating a patron command to (i) pay a first portion of said purchase tab through the pre-defined electronic payment method, and (ii) pay a second portion of said purchase tab through another, non-electronic, payment method; and in response to said signal, the point-of-sale terminal is to initiate electronic payment of only the first portion of said purchase tab and not said second portion.

In some embodiments, the server is (A) to automatically detect that a patron having a smartphone is visiting said business establishment, and to automatically detect that said patron with said smartphone had previously visited said business establishment; and (B) prior to said patron associating said smartphone with a point-of-sale terminal of said business establishment, transmitting to said point-of-sale terminal information indicating one or more preferred products that said patron had previously preferred in said business establishment In some embodiments, the server is to receive from said smartphone of said consumer a wireless signal indicating payment method information exclusively to said server located externally to said business establishment, and wherein said server and said smartphone avoid transmission of said payment method information to a receiver within said business establishment.

In contrast with the present invention, some conventional systems that attempt to establish a connection between a PoS terminal of a merchant and a mobile device of a consumer, do not keep a purchase tab open in real time, do not accumulate purchased items in real time into an open tab that is accessible by (viewable by) the mobile device as the open tab is being updated or modified, and/or do not close the tab only in response to a wireless signal indicating the consumer command (through his mobile device) to close the tab.

In contrast with the present invention, some conventional systems that attempt to establish a connection between a PoS terminal of a merchant and a mobile device of a consumer, spring into action and associate between a smartphone and a Point-of-Sale terminal only after the purchase transaction is completed by the consumer, and only after the consumer added to his "virtual shopping cart" all the items that the consumer decided to purchase, in order to perform electronic payment initiated by the consumer's smartphone, for a specific Transaction that is already known. In contrast, the present invention may allow to create the association prior to the stage in which the consumer already added all the desired items to his virtual shopping cart; and while the consumer is still authorized and enabled to add items to his open tab at the merchant, and while such open tab may still be updated and modified in real time based on new selections by the consumer.

In some embodiments, the remote server may utilize two-way communication with the PoS terminal; such as, to receive from the PoS terminal the information about a tab that needs to be paid for electronically, as well as to transmit to the PoS terminal information about the customer whose tab is being managed at the PoS terminal, discounts or coupons or promotions or special offers or recommended items directed to that specific customer based on his logged history of past purchases, and/or other suitable data. In some embodiments, the remote server may be capable of remotely opening or remotely creating a new tab, at the PoS terminal, based on one or more triggering events; such as, an explicit request of a customer to remotely open such tab; an automatic identification or detection that the customer entered or re-entered a particular business establishment (e.g., that the customer visited before, and in which the customer performed self-checkout before); a process that determines to initiate "predictive" tab opening based on detecting certain operations of the customer (e.g., entering a particular establishment; arriving to a vicinity of a particular establishment, or a lobby or waiting area thereof); or other triggering events or conditions. Optionally, the remote server may be able to remotely add items to the tab being managed on the PoS terminal of the establishment; and the remote server may be able to remotely close such tab and to perform electronic payment for it, without requiring human intervention and/or confirmation from an operator of the PoS terminal or from an employee of the business establishment.

In some embodiments, the system associates in advance between the consumer smartphone and the Point-of-Sale, before the consumer purchased or consumed any products, and before any transactions took place; and the association maintains the consumer's tab open accumulating purchased items until the smartphone wirelessly transmits a wireless communication signal indicating a consumer command (A) to close the purchase tab and (B) to automatically pay for accumulated purchased items by using a pre-defined electronic payment method.

Some conventional systems do not detect any "abandoned tab", and do not handle an abandoned tab for which the consumer failed to complete payment authorization. Some conventional systems rely on the consumer's explicit command or authorization, to perform the electronic payment. Some conventional systems regard an "abandoned tab" as an "abandoned shopping cart", namely, a virtual shopping cart that the consumer added items thereto, and then failed to fully complete a check-out and payment process; such that such items in such "abandoned shopping cart" are treated by the conventional systems as non-purchased, and conventional systems do not force payment for such items which they regard as non-purchased.

In contrast, the present invention may determine through an abandoned tab module, that the consumer exited the business establishment without closing the purchase tab and without paying for the accumulated purchased items within a pre-defined time period; and then, the system automatically closes the purchase tab and proceeds to initiate electronic payment to the business establishment from an electronic account of the "abandoning" consumer. The present invention may thus treat a partially-performed transaction, which the consumer did not "complete" by confirming a final bill, as if it was pre-authorized by the consumer; and may do an automatic "check out" and payment on behalf of the consumer, instead of discarding those items as non-purchased (as the conventional systems may do).

In accordance with the present invention, the system (a remote server, or the PoS terminal of the merchant, or the mobile device of the consumer) may generate a unique time-sensitive per-consumer code, which may be generated uniquely for the particular mobile device of the particular consumer located in the particular establishment location. The unique code may be generated based on, for example, data indicating the geo-spatial location of the consumer's smartphone, and/or data indicating the current date and/or time, and/or current time-and-date stamp, and/or data identifying the merchant whose establishment or restaurant or store the consumer is now visiting. The unique code may automatically expire or "burn out", or may be otherwise terminated or canceled or written-off, upon entry of the unique code to the PoS terminal; in order to prevent re-use or duplicate-use of the unique code.

In some embodiments, the unique code may be a four-digit number which may be time-based, location-based, and user-based in order to ensure uniqueness; and that the consumer may easily show to the merchant, or convey to the merchant verbally, and which the merchant may rapidly type or enter into the PoS terminal in order to finalize the association process. In other embodiments, the unique code may be a Quick Response (QR) code representing a number which may be a function of time-based data, location-based data, and user-based data in order to ensure uniqueness; the consumer may show the QR code on his mobile device to the merchant, who may use a QR scanner to scan the QR code into the PoS terminal, thereby finalizing the association process. Other suitable methods may be used.

The unique code may be calculated remotely (e.g., by a remote server), and may be sent (e.g., securely, wirelessly) to the mobile device of the consumer and also to the PoS terminal of the merchant. Optionally, only the remote server may be able to calculate and generate the unique code, based on data that the remote server may have with regard to the consumer's smartphone and data with regard to the particular merchant; and optionally, the consumer smartphone by itself (or similar, the PoS terminal by itself) may not be capable of generating the unique per-customer code, since it may not have all the data items that only the remote server may have and which may be required for remotely generating the unique code.

In some embodiments, for example, the unique code may be a four-digit number, a three-digit number, a five digit number; or a three-character string, or four character string, or five character string; or may be a code or word or PIN that the consumer may be able to easily convey to the merchant, and that the merchant may be able to easily enter into the PoS terminal in order to instantly make an ongoing association between (a) an open tab (or a newly-opened tab, or a tab currently being opened) of the consumer and (b) a credit-card or debit-card or bank-account record associated with the particular consumer and located or stored remotely (on the remote server of the system administrator) and/or locally (e.g., on the smartphone of the consumer).

Portions of the discussion herein may relate, for demonstrative purposes, to an open tab which may be continuously managed at a PoS terminal and may be remotely controlled (e.g., may be forced to be closed) by a customer via his mobile device. However, some embodiments of the present invention may be used in conjunction with other types of transactions that may occur at real-world stores or establishments or eateries; for example, allowing a customer to utilize his mobile device in order to view, manage, and self-checkout and pay for items that the customer is purchasing over-the-counter at a store or eatery, or for items that the customer is purchasing and do not necessarily require seating or full-service by a waiter, or for discrete transactions or individual transactions (e.g., rather than an accumulated stream of ordered items), or in situations where the customer orders and pays and only then receives the item and/or consumes the item (e.g., over-the-counter purchases), or the like. The present invention may thus be used, similarly, with these and other suitable types of transactions.

The present invention may be implemented in various ways, for example: (a) a stand-alone business-to-consumer (B2C) application for smartphones, tablets and/or mobile devices, which may operate in conjunction with a suitable corresponding module on a remote server and/or installed on a PoS terminal of the merchant; (b) a business-to-business (B2B) solution or module, such as, an integrated module which may be integrated or plugged-in into an existing or new mobile application of a merchant, allowing the merchant to offer to its consumers the "self check-out" or the "instant check-out" option, or the option for initiating and performing a consumer-initiated and consumer-completed check-out process without the need for further confirmation or actions on behalf of the merchant's personnel; (c) a White-Label (WL) solution or module, such as a full white-label mobile application that the system administrator may develop for a particular merchant or vendor or establishment, integrating therein the instant checkout or self-checkout features of the present invention, as well as other content which may be unique to the merchant or establishment (e.g., logo, slogan, menu of products, prices, product descriptions, coupons, promotions, consumer club or loyalty club features, merchant location finder, or the like).

In some embodiments, the system may automatically create a Virtual Loyalty Club membership for any user that utilizes the mobile application of the present invention (e.g., the stand-alone B2C application, or a white-label application, or a merchant application that contains or utilizes the B2B module of the present invention). For example, the consumer may utilize his smartphone in order to do a self check-out at a coffee-shop. The application may generate a new Loyalty Club member number for this user, relative to this particular establishment or merchant (or chain of stores, or chain of restaurants, or the like); and may create a new record in a Loyalty Club database which may be stored on the remote server of the system and/or on the PoS terminal(s) of the merchant and/or on the smartphone of the consumer. The Loyalty Club record may aggregate and log all the data about purchases that the consumer performed, with details about the items purchased, the time-and-date of each purchase, and optionally the price(s) paid and the type of product(s) purchased (e.g., a coffee item; a bakery item; or the like). This may be performed without the consumer's knowledge, and/or without requiring the consumer to pre-approve joining (or actively joining) the Loyalty Club. Subsequently, the loyalty club module may automatically and/or autonomously detect that the accumulated past purchases that the consumer performed, already entitle the consumer (or, are about to benefit the consumer soon) with a prize or coupon or discount or free item; and the loyalty club module may notify the consumer about such entitlement, and may further generate and show to the consumer a unique code or coupon that entitles him to such prize or free item or coupon, once shown to the merchant. This may allow automatic and in-the-background user-transparent creation of Loyalty Club membership; automatic accumulation and logging of purchase data into such Loyalty Club record; and automatic identification or detection of eligibility (or projected eligibility) for benefits due to past transactions; all these, without requiring the user to positively join the Loyalty Club prior to accumulating such benefits or logging such past transactions.

The present invention may provide a system for efficient, real-time, ongoing association between a PoS terminal of an establishment, and a mobile device of a consumer that visits an establishment in order to purchase goods and/or services, optionally in an ongoing transaction in which the consumer adds items or products to a "tab" that is maintained open, and optionally while the consumer continues to order items or products and services which may be supplied (e.g., served, brought) to the consumer while the consumer may still keep the tab open and without requiring the consumer to finalize the transaction, to pay, or to "check out" yet. The real-time association means that the consumer may view his open tab in real time; if the tab is modified, such as when the consumer requests to consume another food item and the waiter updates the tab at the PoS of the restaurant, the tab that the consumer can see on his mobile device is similarly updated, and the consumer may see the up-to-date tab at any given moment after the initial association. Additionally, the consumer may perform, one-sidedly, an instant checkout or a self-checkout, forcing the system and/or the PoS terminal to close the open tab, and forcing the system to perform a payment from a payment method or payment article (e.g., credit card, debit card, bank account) associated with the consumer, to the merchant or to the merchant's account at a payment processing system; without requiring the consumer to request a check to be generated by a waiter, without requiring the PoS terminal to close the open tab so that the consumer can pay and leave, without requiring actual immediate knowledge of the merchant's employees that the consumer is currently closing the tab autonomously and paying via a pre-defined payment method. In some embodiments, if the consumer leaves the establishment without paying, then the system may detect that the open tab has been open for a pre-defined period of time (e.g., 60 or 90 or 120 minutes), and may force a closure of the open tab and may further force and perform a debit to the consumer's pre-defined method of payment, since the tab was abandoned by the consumer. This may be in direct contrast to various "virtual shopping cart" systems, in which a consumer that only added items to a virtual shopping cart, but did not actively perform a complete check-out process including active post-purchase payment, is not billed and is not debited by the merchant; and rather, such "abandoned" virtual shopping cart is typically regarded, in conventional systems, as a partial attempt to perform a transaction that has been abandoned by the consumer and is not forced to be completed (e.g., with payment by the consumer) from the merchant's side.

In some embodiments, a method (e.g., implemented by a system comprising at least a hardware component) comprises: (a) storing in a database a customer profile comprising payment method information pre-defined by said customer; (b) wirelessly receiving from a mobile device of the customer a wireless signal indicating that the customer is visiting a particular business establishment; (c) generating a user-specific code that is a function of, at least, (A) current date-and-time data, and (B) geo-spatial location of the particular business establishment, and (C) customer-specific data; (d) wirelessly sending to the mobile device of the customer said user-specific code; (e) receiving a signal from a Point of Sale (PoS) terminal of said particular business establishment, indicating entry of said user-specific code into said PoS terminal; (f) based on the user-specific code, that was sent to the mobile device of the customer, and that was entered at the PoS terminal of the establishment, creating an ongoing and real-time association between an open tab of ongoing purchases of said customer at said particular business establishment; (g) wirelessly receiving from said mobile device of the customer another wireless signal indicating that the customer commands to force closure of said open tab; (h) remotely closing said open tab of said customer at said particular business establishment, without receiving confirmation for said closure from said particular business establishment; (i) performing electronic payment from said customer to said particular business establishment for said tab that was closed by the customer, using said pre-defined payment method information.

In some embodiments, the user-specific code comprises a numerical code that is suitable for entry into the PoS terminal via typing. In some embodiments, the user-specific code comprises a Quick Response (QR) code to be displayed on the mobile device of the customer and which is scan-able by a scanner of said PoS terminal.

In some embodiments, the method comprises: detecting that a pre-defined time period elapsed since creation of the open tab; forcing automatic closure of said open tab; forcing an automatic check-out process of the customer from said business establishment, by performing electronic payment by the customer via the payment method information pre-defined by said customer, for all items accumulated in said open tab.

In some embodiments, the method comprises: if the open tab of the customer accumulated one or more items, and the customer does not perform one-sidedly a check-out process within a pre-defined time period, then: forcing automatic closure of said open tab; forcing an automatic check-out process of the customer from said business establishment, by performing electronic payment by the customer via the payment method information pre-defined by said customer, for all items accumulated in said open tab.

In some embodiments, the method comprises: wirelessly receiving from the PoS terminal a request to associate between (A) the mobile device of the customer, and (B) the open tab of the customer at the PoS terminal, based on an entered code; comparing the entered code to the user-specific code generated at step (c); unauthorizing to associate between (A) the mobile device of the customer, and (B) the open tab of the customer at the PoS terminal, if the entered code differs from the user-specific code generated at step (c).

In some embodiments, the method comprises: enabling the customer to utilize said mobile device of the customer for (A) forcing closure of the open tab at the business establishment, and (B) forcing self check-out and electronic payment of the customer for items accumulated in said open tab, without requiring manual input from an operator of the PoS terminal of the business establishment.

In some embodiments, the method comprises: automatically enrolling said customer in a virtual loyalty club for customers of said business establishment, based on at least one self check-out operation that the customer performed relative to said business establishment.

In some embodiments, the method comprises: automatically generating a membership record for said customer, in a virtual loyalty club for customers of said business establishment; each time that the customer utilizes the mobile device to perform a self check-out at said business establishment, marking an additional purchase in said membership record of the customer in the virtual loyalty club, without requiring the customer to request said marking from an operator of the PoS terminal, without requiring the customer to show to the operator of the PoS terminal any code indicating membership in the virtual loyalty club, without requiring the operator of the PoS terminal to approve said marking, without requiring the operator of the PoS terminal to manually perform said marking.

In some embodiments, the method comprises: determining the geo-spatial location of said mobile device of the customer; and based on the geo-spatial location of said mobile device, determining the identity of said business establishment; utilizing said identity of the business establishment as a parameter for generating the user-specific code in step (c).

In some embodiments, the method comprises: determining the geo-spatial location of said mobile device of the customer; and generating a list of candidate establishments that are located in proximity to said geo-spatial location of the mobile device of the customer; causing the mobile device of the customer to display said list of candidate establishments; wirelessly receiving from the mobile device of the customer, a wireless signal indicating user selection of one of the candidate establishments on said list; utilizing an identity of the business establishment selected by the customer, as a parameter for generating the user-specific code in step (c).

In some embodiments, the method comprises: determining whether said business establishment is (A) a primary establishment in which said customer utilized self-checkout for a first time, or (B) a secondary establishment in which said customer utilized self-checkout after said user had already utilized self-checkout at one or more other establishments; if the business establishment is a primary establishment, then, charging the primary establishment a first processing fee; if the business establishment is a secondary establishment, then, charging the secondary establishment a second processing fee which is greater than the first processing fee.

In some embodiments, the method is implemented on a computer comprising at least a hardware component.

In some embodiments, the step (b) comprises: wirelessly receiving from a self-checkout mobile application installed on said mobile device of the customer, said wireless signal indicating that the customer is visiting a particular business establishment.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" or "a plurality" as used herein include, for example, "multiple" or "two or more". For example, "a plurality of items" includes two or more items.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the machine-readable or computer-readable or device-readable medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk—Read-Only Memory (CD-ROM), Compact Disk—Read/Write (CD-R/W), DVD, or the like.

In some embodiments, a data processing system suitable for storing and/or executing program code may include at least one processor or controller or circuitry which may be coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices or components (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A method for digitally associating a customer with an open tab, said method implementable on a server external to a business establishment and accessible by multiple business establishments, the method comprising:
   the mobile device determining the current geo-spatial location of a mobile device of a customer using a GPS receiver on said mobile device;
   receiving said geo-spatial location;
   generating a list of candidate establishments that are located in proximity to said geo-spatial location of the mobile device of the customer;
   causing the mobile device of the customer to display said list of candidate establishments;
   wirelessly receiving from the mobile device of the customer, a wireless signal indicating a user selection of one of the candidate establishments on said list;
   generating a user-specific code at least from an identity of the business establishment selected by the customer, current date-and-time data and customer-specific data for a customer having a previously defined customer profile;
   wirelessly sending to the mobile device of the customer said user-specific code;
   receiving a signal from a Point of Sale (PoS) terminal of said particular business establishment, indicating entry of said user-specific code into said PoS terminal;
   based on the user-specific code, digitally associating said customer with an open tab stored in said PoS of ongoing purchases of said customer at said particular business establishment; and
   handling a customer instruction to close said open tab using a pre-defined payment method of said customer stored in said customer profile thereby enabling said customer to leave said establishment.

2. The method of claim 1, wherein the user-specific code comprises a numerical code that is suitable for entry into the PoS terminal via typing.

3. The method of claim 1, wherein the user-specific code comprises a Quick Response (QR) code to be displayed on the mobile device of the customer and which is scanable by a scanner of said PoS terminal.

4. The method of claim 1, comprising:
detecting that a pre-defined time period elapsed since creation of the open tab;
forcing automatic closure of said open tab;
forcing an automatic check-out process of the customer from said business establishment, by performing electronic payment by the customer via the payment method information pre-defined by said customer, for all items accumulated in said open tab.

5. The method of claim 1, comprising:
if the open tab of the customer accumulated one or more items, and the customer does not perform one-sidedly a check-out process within a pre-defined time period, then:
forcing automatic closure of said open tab;
forcing an automatic check-out process of the customer from said business establishment, by performing electronic payment by the customer via the payment method information pre-defined by said customer, for all items accumulated in said open tab.

6. The method of claim 1, comprising:
wireles sly receiving from the PoS terminal a request to associate between (A) the mobile device of the customer, and (B) the open tab of the customer at the PoS terminal, based on an entered code;
comparing the entered code to the user-specific code;
unauthorizing to associate between (A) the mobile device of the customer, and (B) the open tab of the customer at the PoS terminal, if the entered code differs from the user-specific code.

7. The method of claim 1, comprising:
enabling the customer to utilize said mobile device of the customer for (A) forcing closure of the open tab at the business establishment, and (B) forcing self check-out and electronic payment of the customer for items accumulated in said open tab, without requiring manual input from an operator of the PoS terminal of the business establishment.

8. The method of claim 1, comprising:
automatically enrolling said customer in a virtual loyalty club for customers of said business establishment, based on at least one self check-out operation that the customer performed relative to said business establishment.

9. The method of claim 8, comprising:
automatically generating a membership record for said customer, in a virtual loyalty club for customers of said business establishment;
each time that the customer utilizes the mobile device to perform a self check-out at said business establishment, marking an additional purchase in said membership record of the customer in the virtual loyalty club,
without requiring the customer to request said marking from an operator of the PoS terminal,
without requiring the customer to show to the operator of the PoS terminal any code indicating membership in the virtual loyalty club,
without requiring the operator of the PoS terminal to approve said marking,
without requiring the operator of the PoS terminal to manually perform said marking.

10. The method of claim 1, further comprising:
determining whether said business establishment is (A) a primary establishment in which said customer utilized self-checkout for a first time, or (B) a secondary establishment in which said customer utilized self-checkout after said user had already utilized self-checkout at one or more other establishments;
if the business establishment is a primary establishment, then, charging the primary establishment a first processing fee;
if the business establishment is a secondary establishment, then, charging the secondary establishment a second processing fee which is greater than the first processing fee.

11. The method of claim 1, wherein the method is implemented on a computer comprising at least a hardware component.

12. The method of claim 1, and also comprising:
wirelessly receiving from a self-checkout mobile application installed on said mobile device of the customer, said wireless signal indicating that the customer is visiting a particular business establishment.

13. The method of claim 1, wherein said user-specific code is time-sensitive.

* * * * *